(12) United States Patent  (10) Patent No.: US 7,975,374 B2
Williams  (45) Date of Patent: Jul. 12, 2011

(54) PRESS FOR ASSEMBLING RAILING SYSTEMS

(75) Inventor: Luc Williams, Saint-Alphonse (CA)

(73) Assignee: Williams Interlocking Systems Inc., Saint-Alphonse, Quebec (CA)

( * ) Notice: Subject to any disclaimer, the term of this patent is extended or adjusted under 35 U.S.C. 154(b) by 1175 days.

(21) Appl. No.: 11/678,360

(22) Filed: Feb. 23, 2007

(65) Prior Publication Data

US 2007/0214856 A1    Sep. 20, 2007

Related U.S. Application Data

(60) Provisional application No. 60/867,443, filed on Nov. 28, 2006.

(30) Foreign Application Priority Data

Feb. 24, 2006  (CA) .................................... 2537683

(51) Int. Cl.
*B23P 21/00* (2006.01)
*B23P 11/00* (2006.01)

(52) U.S. Cl. ........... 29/788; 29/787; 29/243.53; 29/513; 29/509; 72/455

(58) Field of Classification Search ............. 29/513, 29/512, 511, 510, 509, 787, 788, 243.5, 243.53; 72/455, 456; 100/269.17
See application file for complete search history.

(56) References Cited

U.S. PATENT DOCUMENTS

| | | | | |
|---|---|---|---|---|
| 1,355,213 A * | 10/1920 | Chipperfield | ................ | 29/513 |
| 1,637,652 A * | 8/1927 | Ness | ................ | 416/187 |
| 2,648,896 A * | 8/1953 | Krumm | ................ | 269/45 |
| 3,495,527 A * | 2/1970 | Lafreniere | ................ | 100/226 |
| 3,552,086 A * | 1/1971 | Allen | ................ | 52/783.18 |
| 3,962,774 A | 6/1976 | Noro | | |
| 4,014,520 A | 3/1977 | Walters | | |
| 4,245,960 A * | 1/1981 | Matthews | ................ | 416/244 R |
| 4,334,671 A | 6/1982 | De Guise | | |
| 4,753,420 A | 6/1988 | Kaaria | | |
| 4,805,879 A | 2/1989 | Spera | | |
| 4,843,775 A * | 7/1989 | Armstrong et al. | ................ | 52/656.4 |
| 5,068,957 A * | 12/1991 | Felson | ................ | 29/566 |
| 5,200,240 A | 4/1993 | Baker | | |
| 5,427,297 A * | 6/1995 | Tymianski | ................ | 227/109 |
| 5,649,688 A | 7/1997 | Baker | | |
| 6,029,954 A | 2/2000 | Murdaca | | |
| 6,299,142 B1 | 10/2001 | Chaney et al. | | |
| 6,637,095 B2 * | 10/2003 | Stumpf et al. | ................ | 29/513 |
| 6,752,385 B2 | 6/2004 | Zen et al. | | |
| 6,820,455 B1 * | 11/2004 | Bainter | ................ | 72/455 |
| 7,010,851 B2 * | 3/2006 | Cassese et al. | ................ | 29/714 |
| 7,594,518 B2 * | 9/2009 | Issagholian-Havai | ................ | 138/37 |
| 2005/0051762 A1 | 3/2005 | Giralt | | |
| 2005/0246896 A1 * | 11/2005 | Min | ................ | 29/890.036 |
| 2006/0175594 A1 * | 8/2006 | Burkart et al. | ................ | 256/65.02 |
| 2007/0217878 A1 * | 9/2007 | Byrd | ................ | 408/16 |

FOREIGN PATENT DOCUMENTS

JP            04313431 A  * 11/1992

* cited by examiner

*Primary Examiner* — Essama Omgba
(74) *Attorney, Agent, or Firm* — Norton Rose OR LLP

(57) ABSTRACT

The press is used for assembling a section of a railing system. It comprises at least one set of tab-bending punch heads designed to bend end tabs provided on pickets. The tabs are inserted through a corresponding opening made in a rail of the section of the railing system before activating the press. Using this press, a plurality of pickets can be simultaneously connected to the rails.

16 Claims, 14 Drawing Sheets

PRESS FOR ASSEMBLING RAILING SYSTEMS

CROSS-REFERENCE

The present application claims the benefits of Canadian patent application No. 2,537,683 filed Feb. 24, 2006 and entitled "Aluminum railings"; and the benefits of U.S. provisional patent application No. 60/867,443 filed Nov. 28, 2006 and entitled "Press for assembling railing systems", the content of both applications being hereby incorporated by reference.

BACKGROUND

Over the years, aluminium railing systems have become increasingly popular due to their relatively low cost combined with the vast number of innovative designs offered by manufacturers. The maintenance of these systems is very easy compared to wood or other competing materials. In addition to balustrades, aluminium railing systems (also referred to aluminum railing systems) are now also used extensively for other purposes, such as fences, ornamentations, etc.

In most railing systems, the balusters, hereafter generically referred to as pickets, are spaced apart between two parallelly disposed rails. The connection between the pickets and the rails involve screws or rivets connecting at least some of the pickets while other pickets can simply be held in place using intermediary spacers inserted in the rails.

One of the challenges when designing railing systems, in particular those made of aluminium, is to suitably connect the pickets and the rails together while still offering an aesthetically pleasing aspect and minimizing the costs. Room for further improvements always exists.

SUMMARY

In one aspect, there is provided a press for assembling a section of a railing system, the apparatus comprising a main frame having a front portion; a bottom transversal beam rigidly connected to the front portion of the frame; an upper transversal beam extending substantially parallel to the bottom beam, a movable supporting assembly provided between the upper beam and the main frame to move the upper beam in a plane defined generally by the front portion of the main frame; at least one set of tab-bending punch heads, the set being disposed on the bottom beam or the upper beam; and a plurality of picket holders extending in at least one transversal row between the bottom and upper beams.

In another aspect, there is provided a press for at least partially assembling a section of a railing system, the railing system having two parallel and spaced apart rails between which are provided a plurality of spaced-apart pickets to be connected to at least one of the rails by means of end tabs, the press comprising a main frame having a front portion; a bottom transversal beam connected to the front portion of the main frame; an upper transversal beam connected to the front portion of the main frame; a movable supporting assembly configured and disposed to move at least one among the bottom transversal beam and the upper transversal beam in a plane defined by the front portion of the main frame, the bottom transversal beam and the upper transversal beam, a first transversal row of spaced-apart punch heads provided over the bottom transversal beam; a second transversal row of spaced-apart punch heads provided under the upper transversal beam and facing the punch heads of the first row; at least one transversal row of picket holders adjacent to the front portion of the main frame between the bottom transversal beam and the upper transversal beam, each picket holder of each row being in registry with one punch head in the first row and one punch head in the second row. In use, the end tabs of the pickets are bended by the punch heads upon moving the bottom transversal beam and the upper transversal beam closer to each other.

In a further aspect, there is provided a method of assembling a picket and a rail of a railing system using a press, the rail having a plurality of spaced-apart openings, the method comprising inserting the rail in the press; inserting an end of the picket into one of the openings from a first side of the rail, the end of the picket including at least two spaced-apart end tabs extending lengthwise; and pressing a punch head against the tabs from a second end of the rail to bend the tabs outwardly until the picket is rigidly connected to the rail.

DETAILED DESCRIPTION

The following detail description is made with reference to the appended figures which illustrate one or more non-limitative examples of the improved way of connecting pickets and rails in a railing system. The detailed description initially describes what is shown in the figures. A non-limitative list of examples of variants is provided at the end of the detailed description.

Figure 1:
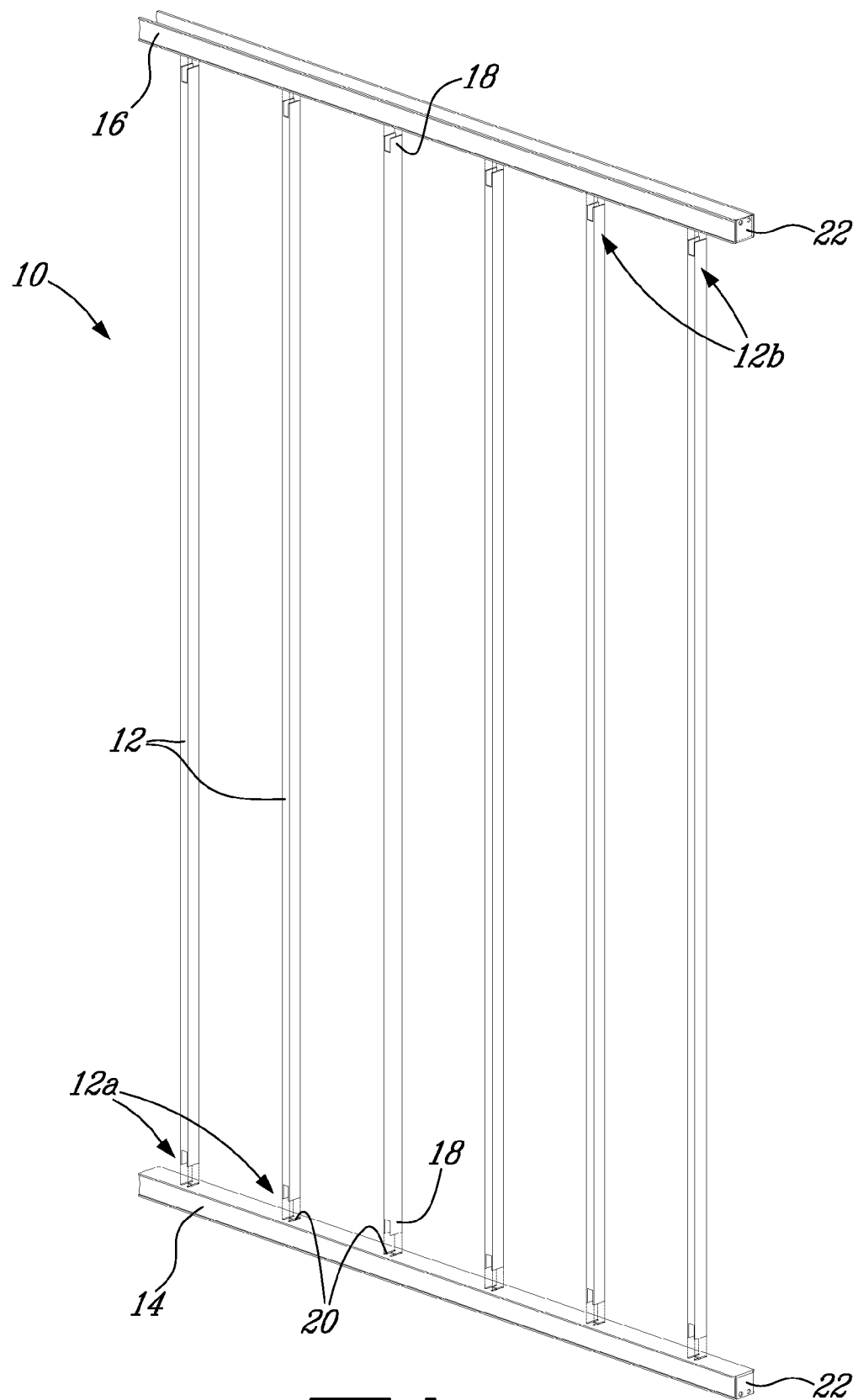
FIG. 1 is an isometric exploded view of an example of a section of a railing system with an example of the improved way of connecting the pickets and the rails, the parts being shown prior to connection.

FIG. 1 illustrates an example of a section 10 of a railing system designed with the improved way of connecting the pickets and the rails. The pickets 12 and the rails 14, 16 in FIG. 1 are illustrated prior to their assembly.

Figure 2:
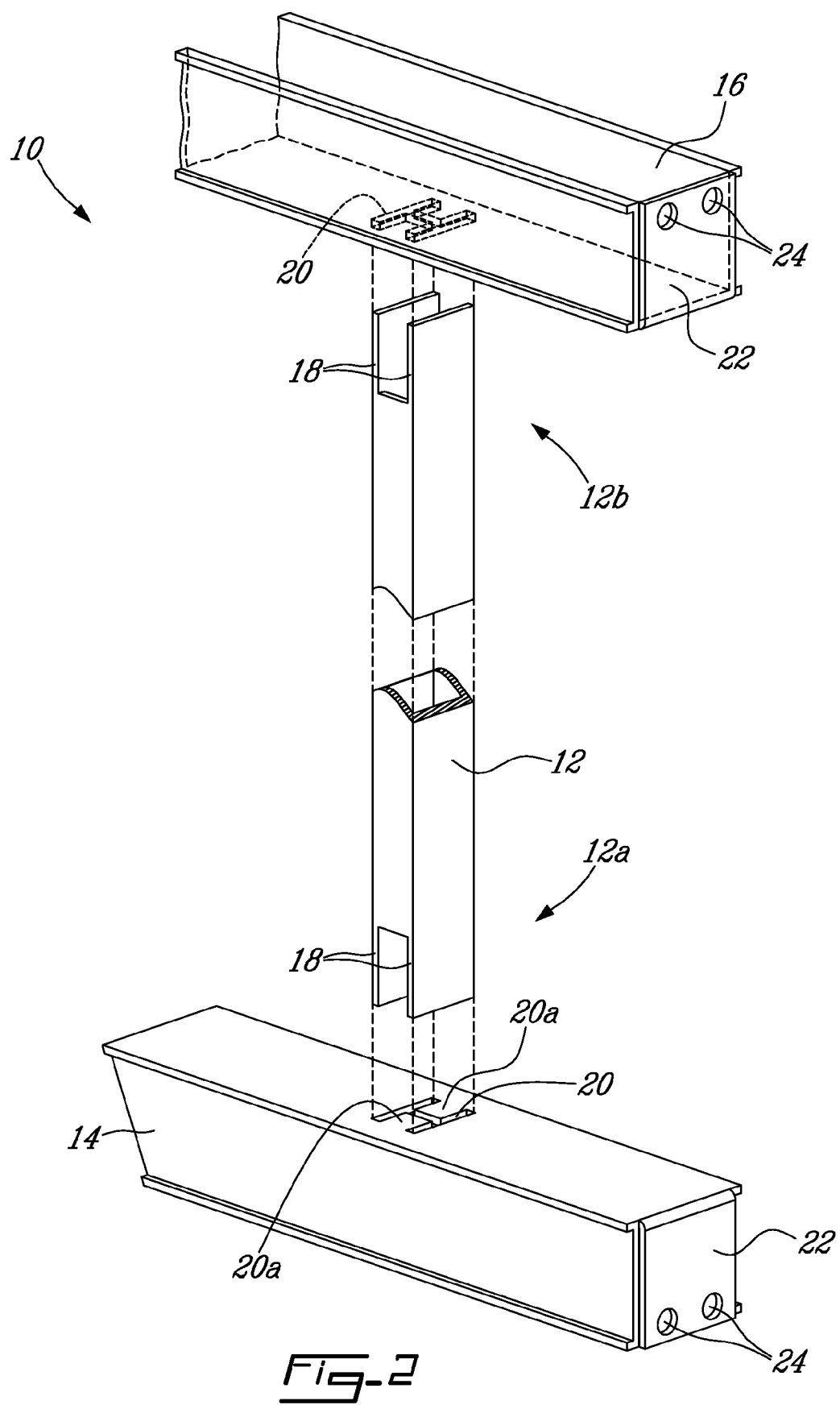
FIG. 2 is an enlarged and partial cross-sectional view of one of the pickets at the side of the section of the railing system shown in FIG. 1.

FIG. 2 is an enlarged, partial cross-sectional view of one of the pickets 12 at the side of the section 10 shown in FIG. 1.

The picket 12 is in the form of an extruded hollow tube with a rectangular cross section. The pickets 12 have opposite ends 12a, 12b. Each end has a pair of parallel and spaced-apart retaining tabs 18 initially extending lengthwise. The tabs 18 are flat and a shoulder is defined at each end 12a, 12b of the pickets 12, between the roots of the tabs 18. The tabs 18 are made of a ductile material. As can be seen in the figures, tabs 18 at the opposite ends 12a, 12b of each picket 12 are configured to snugly fit into a corresponding pair of H-shaped openings 20, one opening 20 being in the bottom rail 14 and the other being in the upper rail 16. A plurality of these openings 20 are provided through the major sides of the rails 14, 16, namely the opposite sides corresponding to horizontally-extending top and bottom surfaces of each rail 14, 16. The rails 14, 16 are substantially U-shaped and parallel to each other. Both rails 14, 16 then have mutually-facing sides between which the pickets extend once connected. The illustrated upper rail 16 is designed to be used with a corresponding snap-in upper member (not shown) fitting thereon to hide the upper interior of the rail 16.

Figure 3:
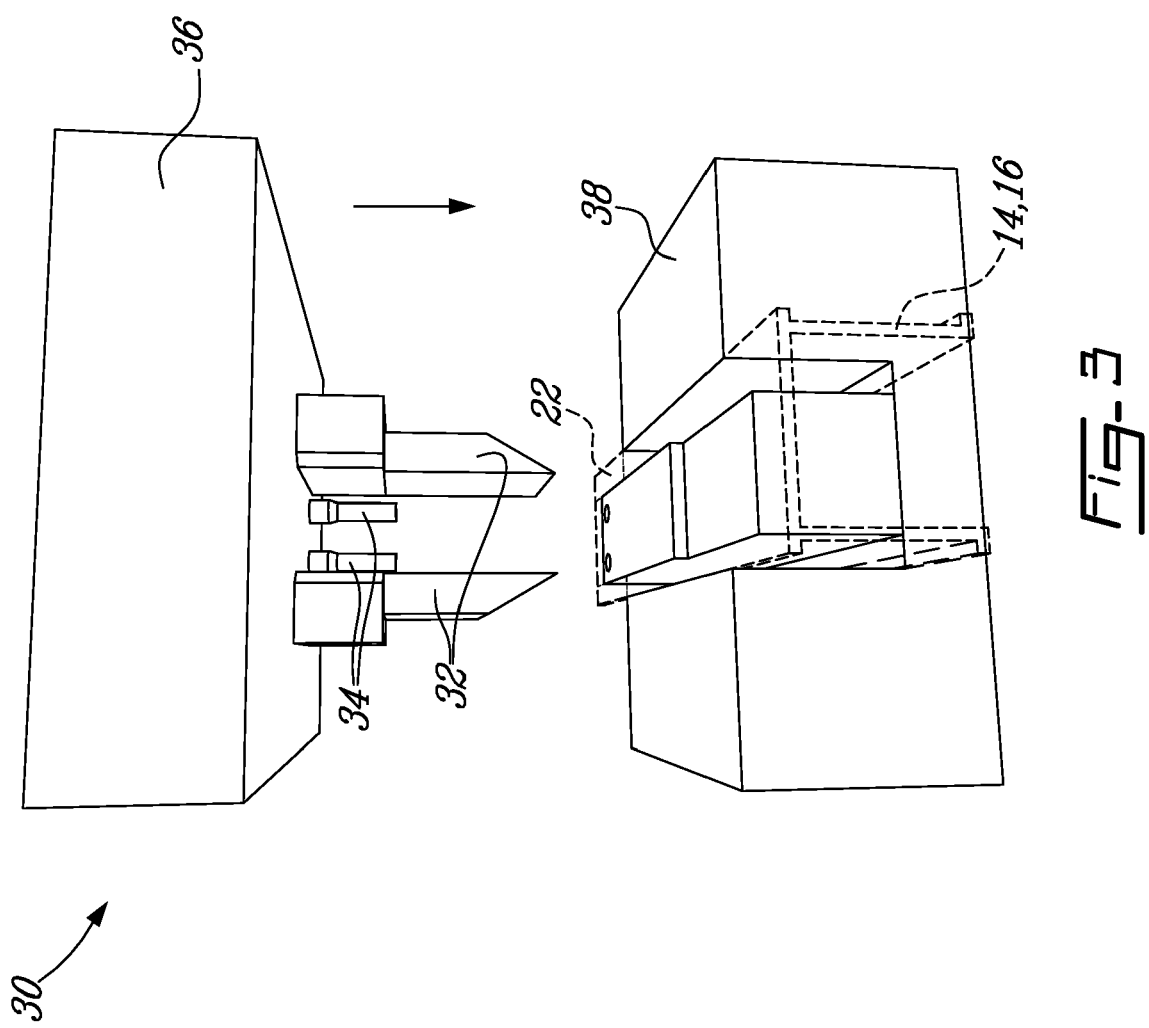
FIG. 3 is a perspective view of an example of an apparatus to form a bracket in a rail.
Figure 4:
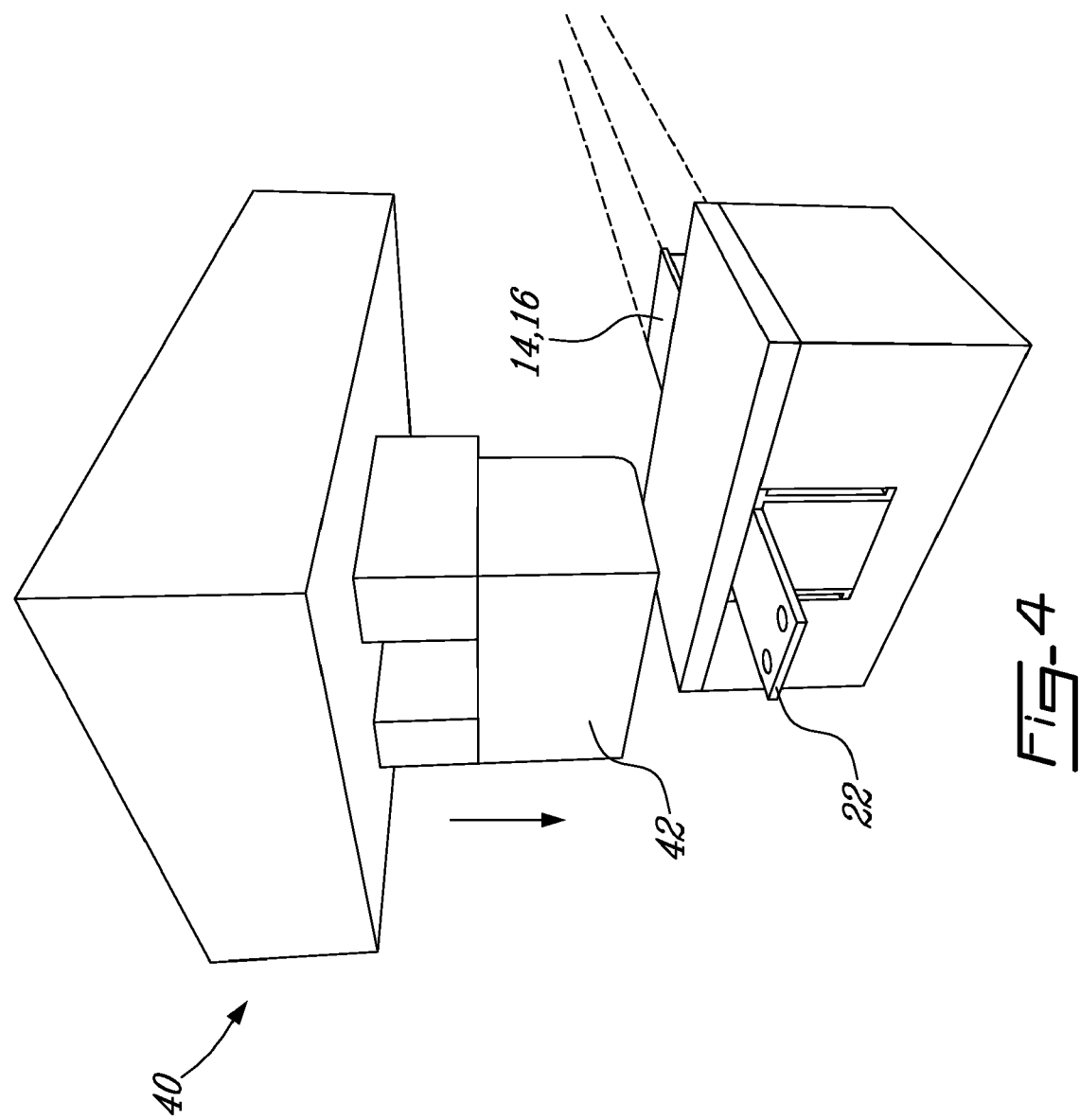
FIG. 4 is a perspective view of an example of an apparatus to bend a bracket in a rail.

Also as illustrated, the ends of the rails 14, 16 have an optional bracket 22 provided with holes 24. Each bracket 22 is a bended end portion of the rail 14, 16 made prior to the assembly of the section 10. The brackets 22 are used to connect the assembled section 10 to a post or to another vertically-supporting surface of a supporting structure, such as a wall or the like. Each bracket 22 can be made using the apparatus 30 shown in FIG. 3. This apparatus 30 comprises a small press having two side cutting members 32 and punches 34, all of which are designed to create a bracket 22 and its holes 24 when the upper portion 36 of the apparatus 30 is moved downwards. The rail 14, 16 is maintained in place by a holder 38. Once cut in the apparatus 30, each bracket 22 will still be straight with reference to the main longitudinal axis of the rail 14, 16. It may then be bended in a second apparatus 40, an example of which is shown in FIG. 4, where a tool 42 is moved downwards so as to bend the bracket 22 until it extends perpendicularly with reference to the main longitudinal axis, as shown in FIG. 2.

Figure 5:
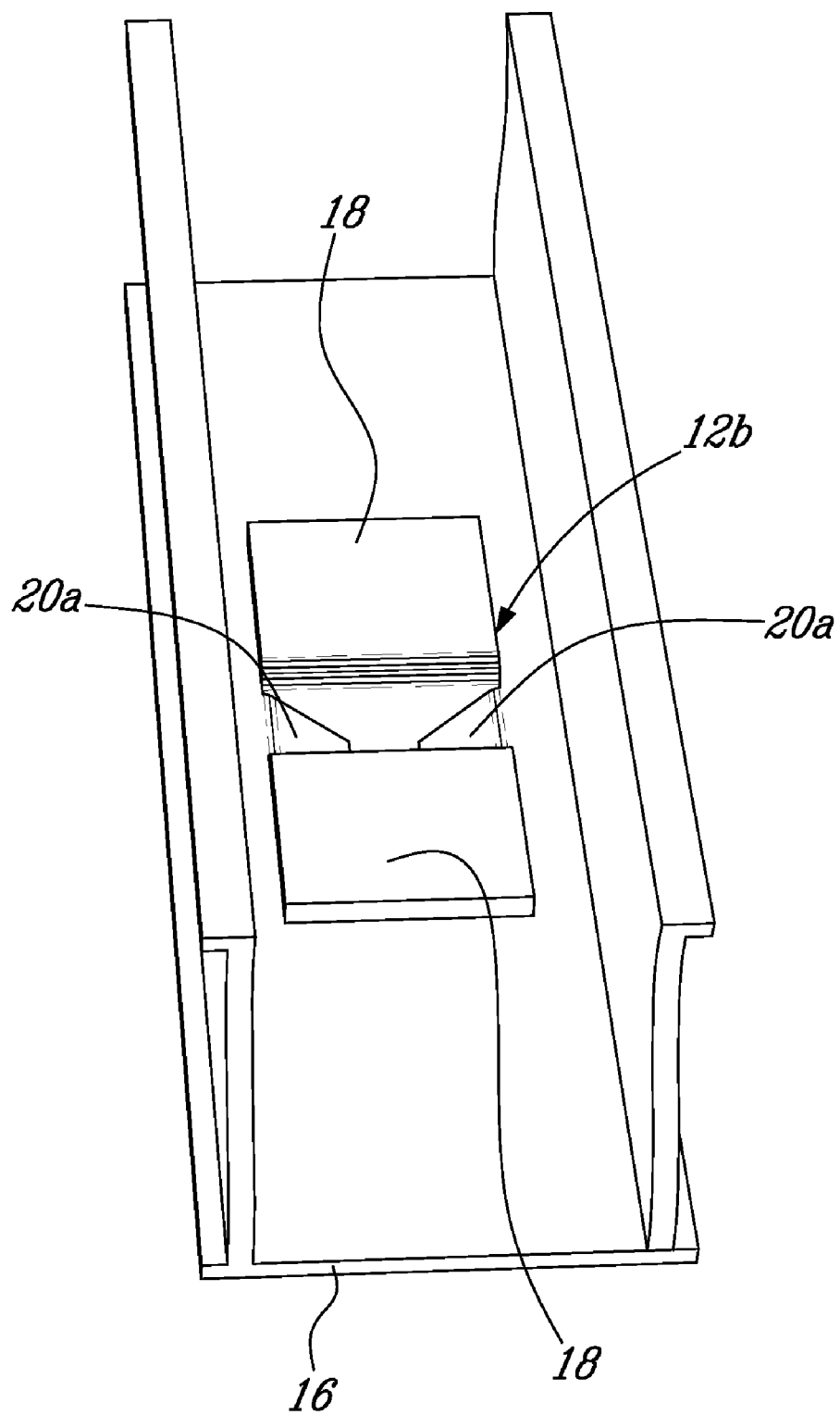
FIG. 5 is an isometric view showing an example of a portion of a rail with tabs of a picket bended to provide the rigid connection between them.

FIG. 5 is an isometric view of the upper end 12b of the picket 12 shown in FIG. 2 once the tabs 18 thereof are bended over the interior of the upper rail 16. The two opposite flanges 20a of the H-shaped opening 20 may also be slightly bended inside the interior of the picket 12, as shown. The roots of these flanges 20a engage a portion of a respective side of the shoulder of the upper end 12b to provide a transversal stability. This arrangement retains the picket 12 and the rail 16 so as to prevent them from moving relative to each other. Moreover, since the shoulders are prevented from entering the openings 20, the pickets do not require additional element to hold them in place.

It should be noted that the bracket 22 is not shown in FIG. 5. The connection between the bottom end 12a of the picket 12 and the bottom rail 14 is identical in the illustrated embodiment.

Figure 6:
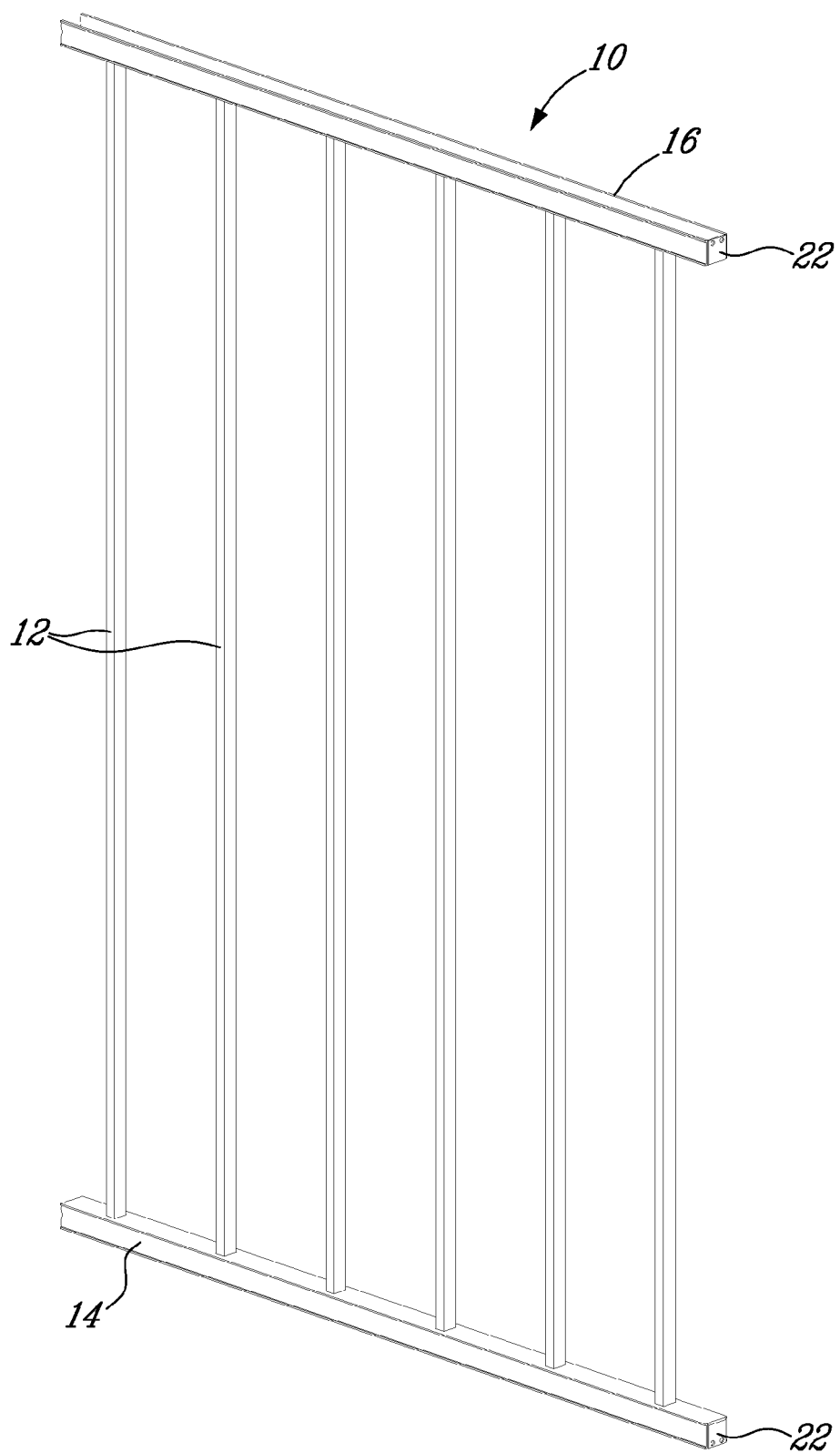
FIG. 6 is an isometric view of the example of the section of the railing system shown in FIG. 1 once the pickets are connected to the rails.

FIG. 6 is an isometric view of the section 10, shown once the various parts of FIG. 1 are assembled.

The above-mentioned improved way of connecting a picket 12 and a rail 14, 16 has many advantages. One of them is that the use of screws or rivets is highly minimized since they are not required for connecting pickets and rails. Screws or rivets, particularly those made of stainless steel, are relatively expensive and require an intensive and time-consuming labour when used as often as they were in conventional railing systems.

As aforesaid, the improved way of connecting the pickets 12 and the rails 14, 16 requires that the tabs 18 of the pickets 12 be bended during the assembly. This can be done using a press designed to connect two or more pickets 12 with one or more rails 14, 16 simultaneously. This press can be used to assemble sections 10 of the railing system very quickly and efficiently, thereby highly increasing productivity.

Figure 7:
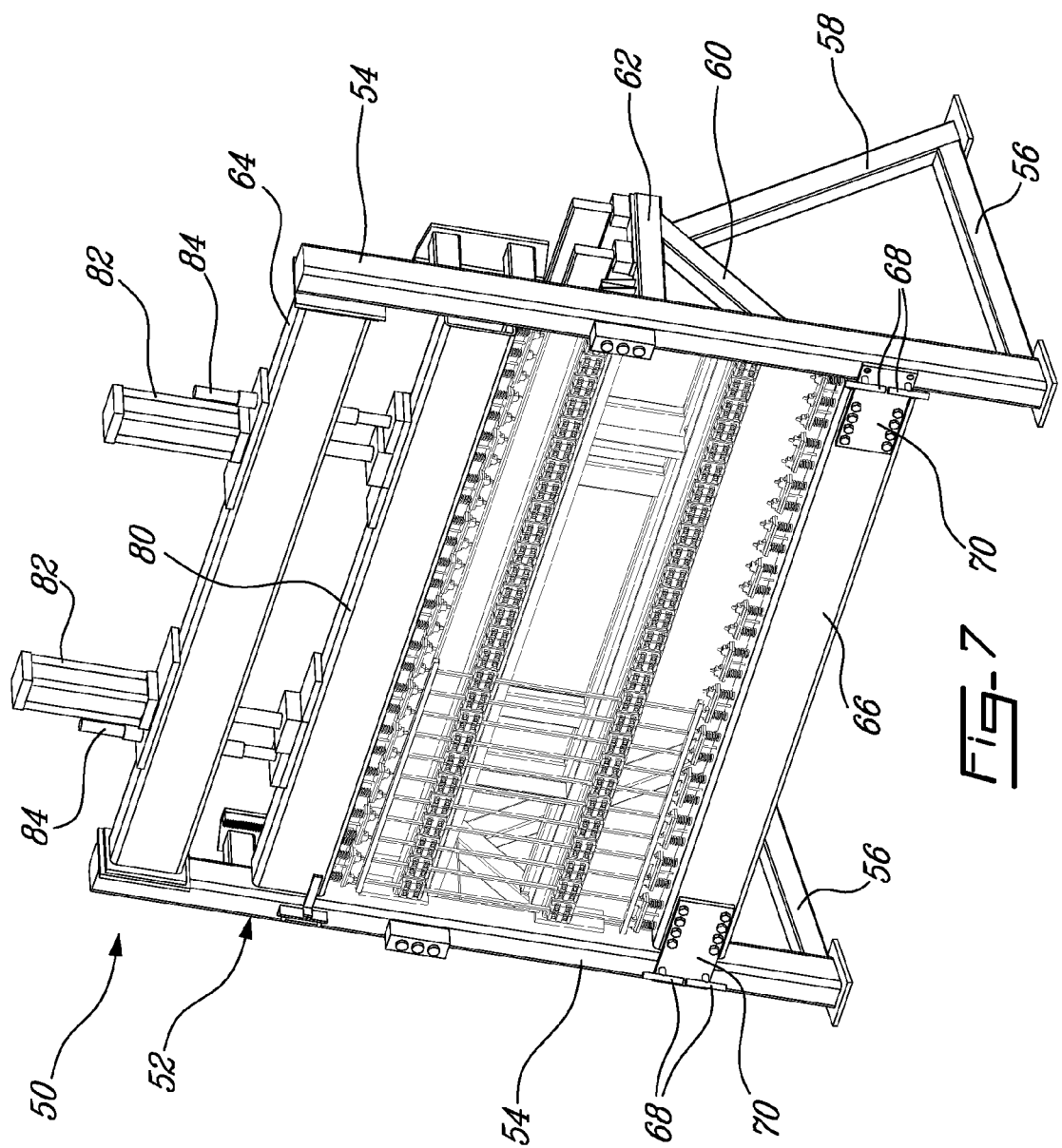
FIG. 7 is an isometric view of an example of a press for assembling railing systems.
Figure 8:
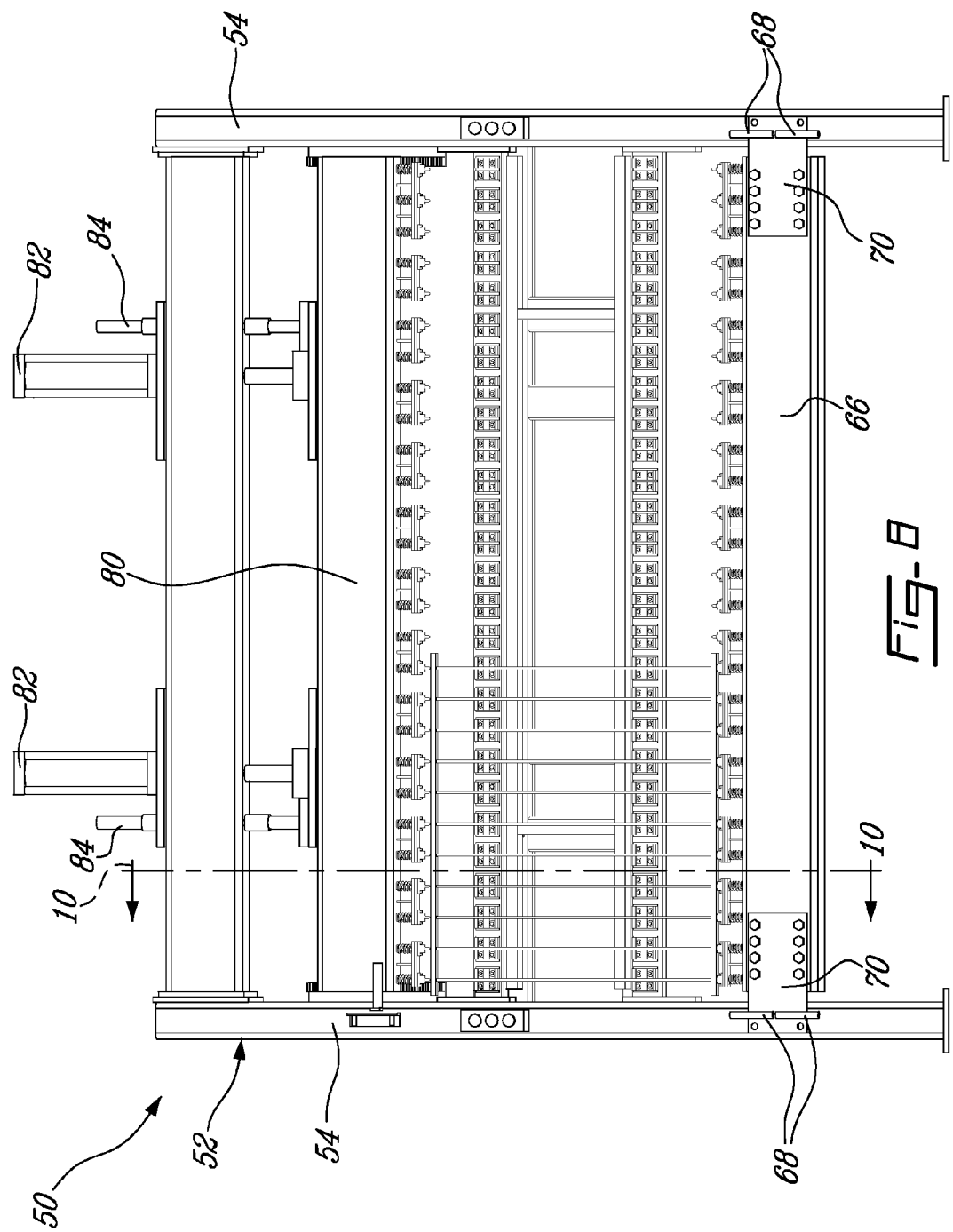
FIG. 8 is a front elevation view of the press shown in FIG. 7.
Figure 9:
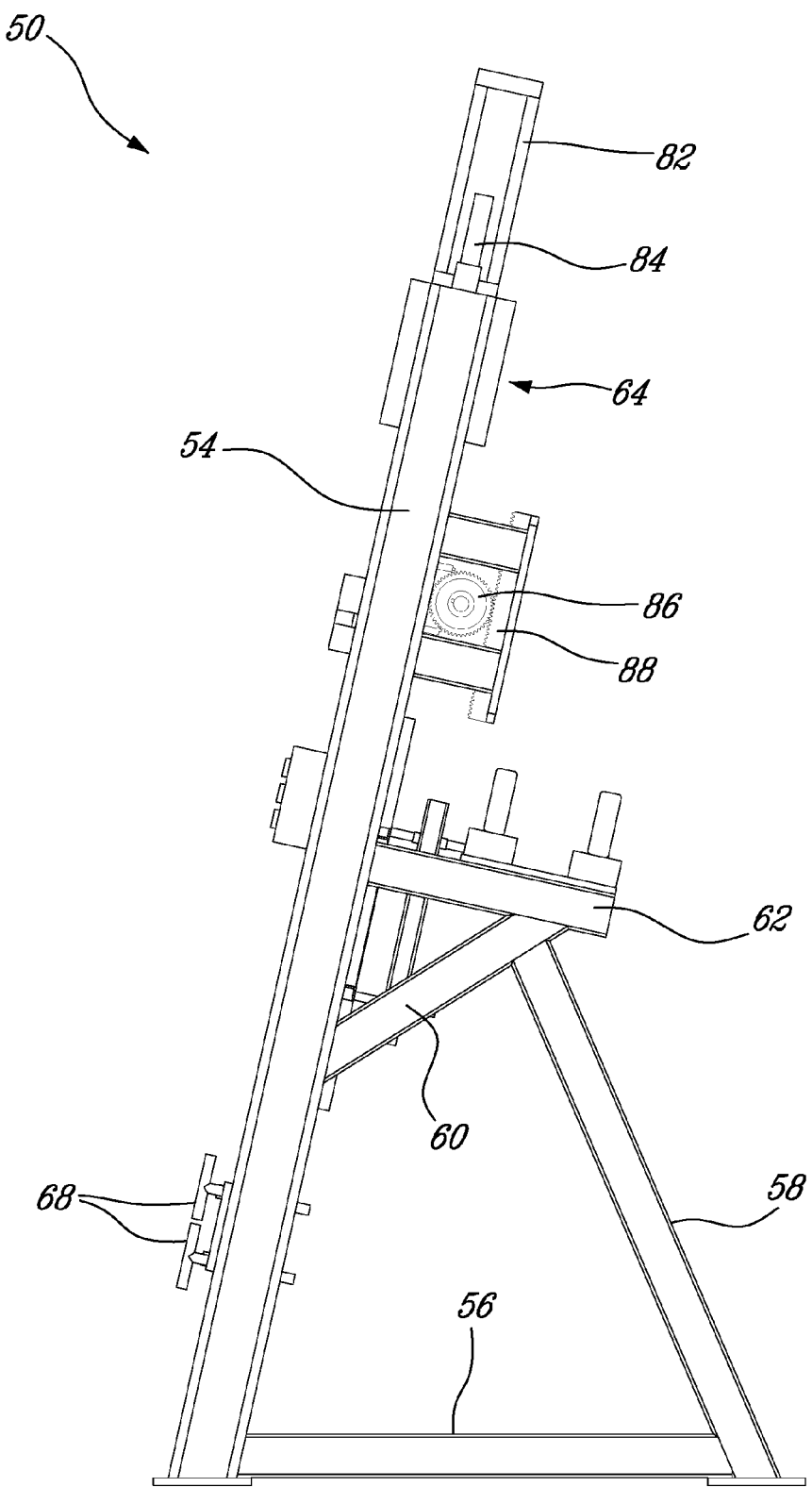
FIG. 9 is a side elevation view of the press shown in FIG. 7.
Figure 10:
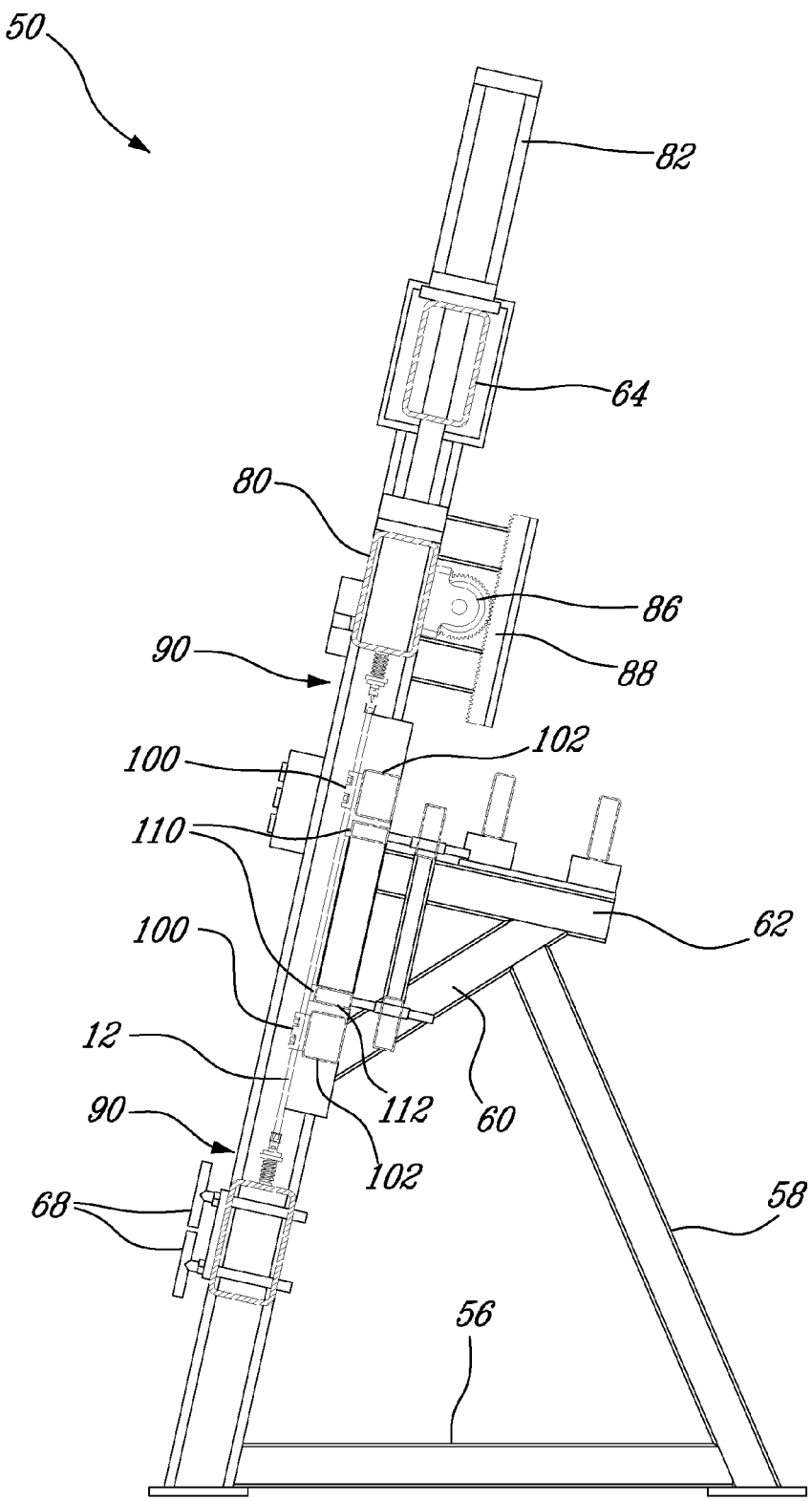
FIG. 10 is a side elevation and partial cross-section view of the press, as taken from line 10-10 in FIG. 8.

FIGS. 7 to 12 show an example of a press 50 in which a railing section 10 can be assembled using the improved way of connecting pickets 12 and rails 14, 16 in one stroke of the press 50. FIG. 7 is an isometric view of the press 50 prior to operation thereof. FIG. 8 is a front elevation view of the press 50 of FIG. 7. FIG. 9 is a side elevation view of the press 50 of FIG. 7. FIG. 10 is a partial cross-section view taken along line 10-10 in FIG. 7.

The press 50 comprises a main frame 52 to which most of the parts are connected. It should be noted that in the figures, the electric cables and hydraulic lines have been omitted to simplify the drawings.

The main frame 52 comprises two main vertically extending beams 54 supported at the back by a plurality of cross-beams 56, 58, 60, 62 and connected together with a head beam 64. The press 50 also comprises a bottom transversally disposed beam 66 bolted or otherwise connected to the main frame 52. As can be seen, the press 50 is slightly inclined towards the back. This inclination facilitates the positioning of the pickets 12, as explained hereafter.

If desired, the exact position of the bottom beam 66 in the illustrated embodiment can be modified by unscrewing side bolts 68 that connect side brackets 70 of the bottom beam 66 to the main frame 52. The bottom beam 66 can be repositioned and once the location is found, the side bolts 68 are inserted in corresponding threaded holes (not shown). Optionally, an arrangement can be provided to support the bottom beam 66 when the side bolts 68 are removed and to assist its up and down movement. Such arrangement can include, for example, a winch (not shown) to be manually operated. This height adjustment may be necessary to fit taller or smaller sections of railing systems. For instance, it may be required to reposition the bottom beam 66 downwards for assembling sections to be used in fences after assembling section to be used for a balcony. Still, if desired, a system (not shown) can be provided for automatically adjusting the position of the bottom beam 66 without the need of removing bolts.

It should be noted that in the case of fences, only the bottom end of the pickets may be rigidly connected to a rail using the improved way described herein. A second rail can be present in the section of the railing system but this upper rail is not necessarily connected to the upper end of the pickets. For instance, the upper rail can be stamped in such a way that each opening for the pickets has a downwardly-projecting tab on one side thereof. This tab is provided for receiving a fastener, such as a screw or a rivet, so as to hold the upper rail to the pickets. It is not necessary, however, to have a fastener at each picket. The upper ends of the picket can be flat or otherwise shaped. Some or all may be receiving an ornament, for example an arrow-shaped member.

An upper transversal beam 80 is disposed substantially parallel to the bottom beam 66. In the illustrated embodiment, the upper beam 80 is supported and moved using a pair of hydraulic actuators 82 mounted on the head beam 64 and having one end attached to the upper beam 80. Each actuator 82 is used with a corresponding linear guide 84 on the side thereof. Also, the rear of the upper beam 80 is supported by a gear 86 (FIG. 9) in mesh with a corresponding rack 88 on each side of the main frame 52.

The bottom and the upper beam 66, 80 each comprises a corresponding set of punch heads 90. The punch heads 90 of the upper set are configured and disposed to be opposite the ones of the first set. There is one punch head 90 in the set at the bottom beam 66 that corresponds to each punch head 90 at the upper beam 80.

At least one transversal row of picket holders extends between the bottom and the upper beam 66, 80. In the illustrated embodiment, two rows are provided. Each row comprises a plurality of pairs of holding members 100 secured to a corresponding transversal beam 102 of the main frame 52 by screws 104. Oblong holes (not shown) allow the individual holding members 100 to be moved and adjusted so as to hold pickets 12 of various widths. The holding members 100 are designed to be tightly fitted around the sides of the pickets 12 but without preventing them from sliding vertically. The inclination of the main frame 52 prevents the pickets 12 from falling off. The holding members 100 can be made of plastic or another suitable material preventing damage to the pickets during operation of the press 10. Each row of holding members 100 also has a corresponding back support 110 on an adjacent transversal beam 112 to support the back of the pickets 12. The supports 110 can also be made of plastic or another suitable material preventing scratching the pickets 12 during operation of the press 50. The press 50 is designed and set so that the pickets 12 are in perfect registry with the openings 20 made in the rails 14, 16.

Figure 11:
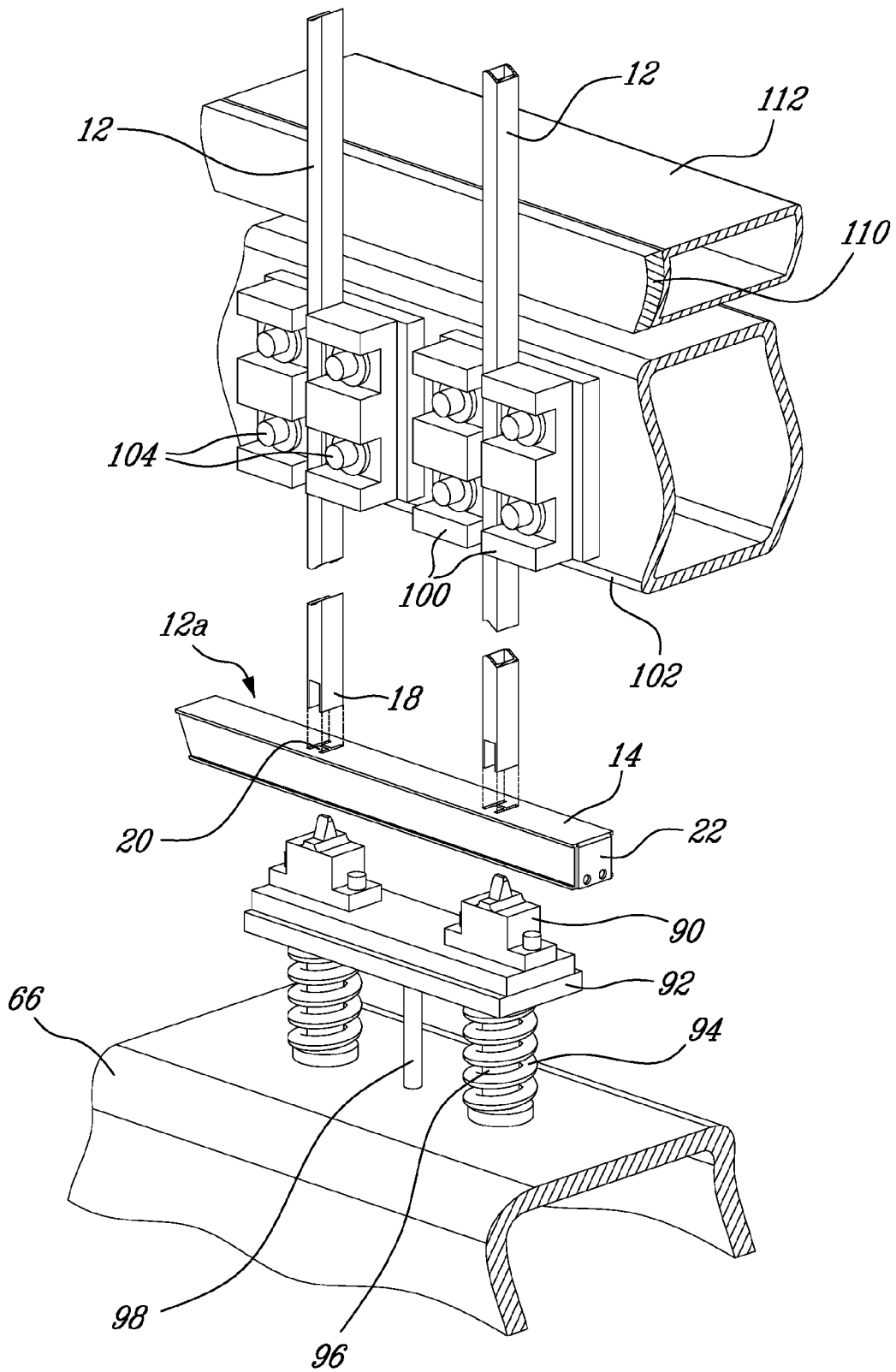
FIG. 11 is an enlarged and partial cross-sectional view of a bottom region of the press shown in FIG. 7.
Figure 12:
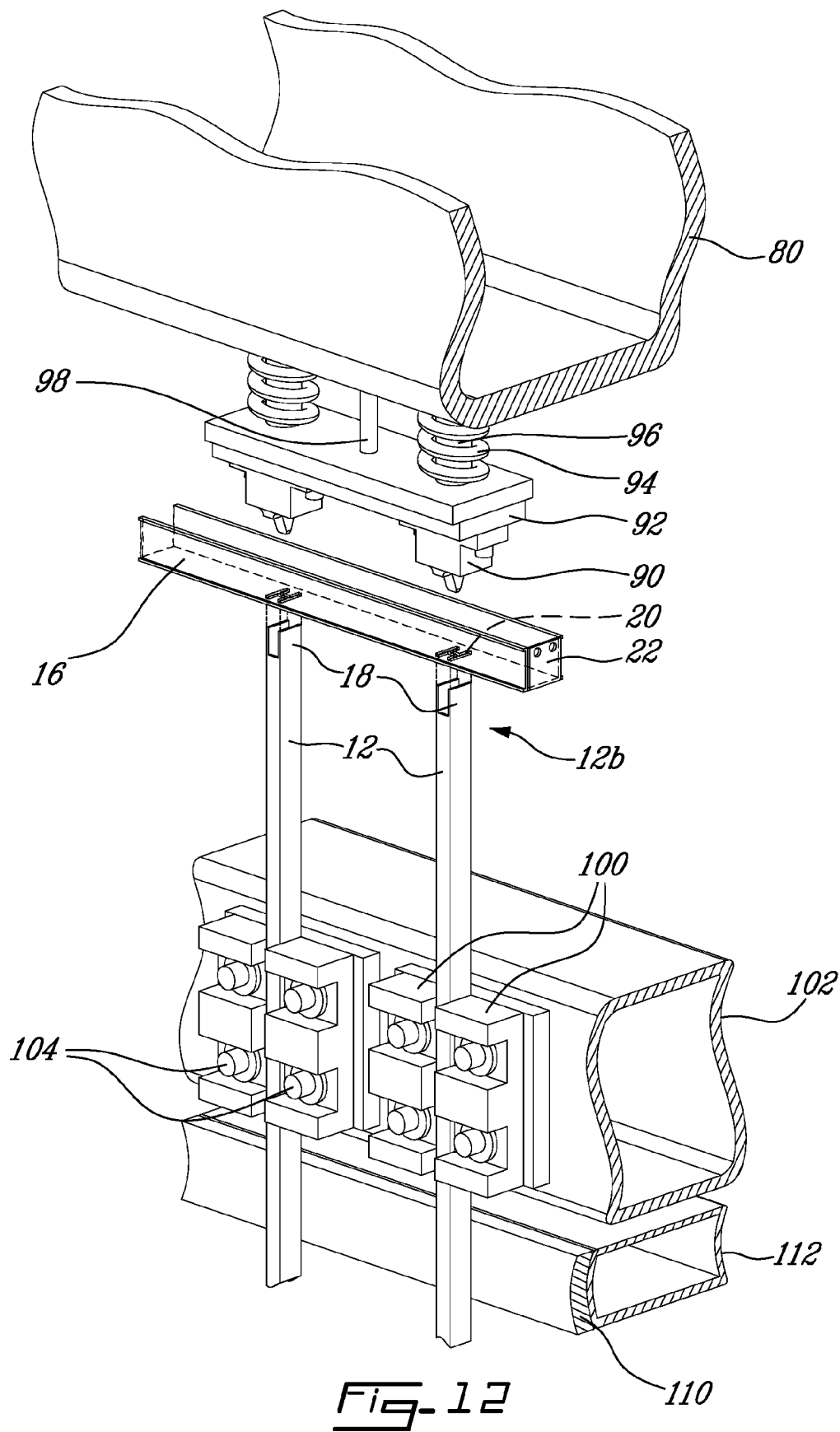
FIG. 12 is a view similar to FIG. 11, showing an upper region of the press.

FIGS. 11 and 12 are enlarged views of the set of punch heads 90 prior to operation of the press 50.

In the illustrated embodiment, most of the punch heads 90 are provided in pairs on a common support 92. Three punch heads 90 at the far right are on a same base. The punch heads 90 of each pair are connected to the support 92 that is itself supported on the corresponding bottom or upper beam 66, 80. Helical springs 94 are mounted around a corresponding stem 96 underneath each punch head 90. The springs 94 urge the support 92 away from the beam 66, 80. A central stem 98 is also present and serves as a guide. This configuration provides flexibility when the press 50 is operated.

In use, the bottom rail 14 is inserted with its openings 20 being in registry with the corresponding punch heads 90. The openings 20 were made previously using another apparatus (not shown). Pickets 12 are then positioned between corresponding pairs of holding members 100, with their tabs 18 being inserted through the corresponding openings 20 of the bottom rail 14. The upper rail 16 is inserted over the upper tabs 18 of the pickets 12 prior to the operation of the press 50.

When all the parts are in place, the upper beam 80 of the press 50 is moved downwards in order to bring the punch heads 90 provided on the upper beam 80 in contact with the tabs 18 of the upper end 12b of the pickets 12. As the upper beam 80 moves further down, the tip of the tabs 18 slides on the side of the punch head 90 until each tab 18 reaches a position that is about 90 degrees from its original position. Simultaneously, as the pickets 12 are pushed down by the punching heads 90 of the upper beam 80, the tabs 18 of the bottom end 12a of the pickets 12 are urged against the punch heads 90 of the bottom beam 66. This results in the tabs 18 at the bottom moving away from each other until both are about 90 degrees from their original position.

Figure 13:
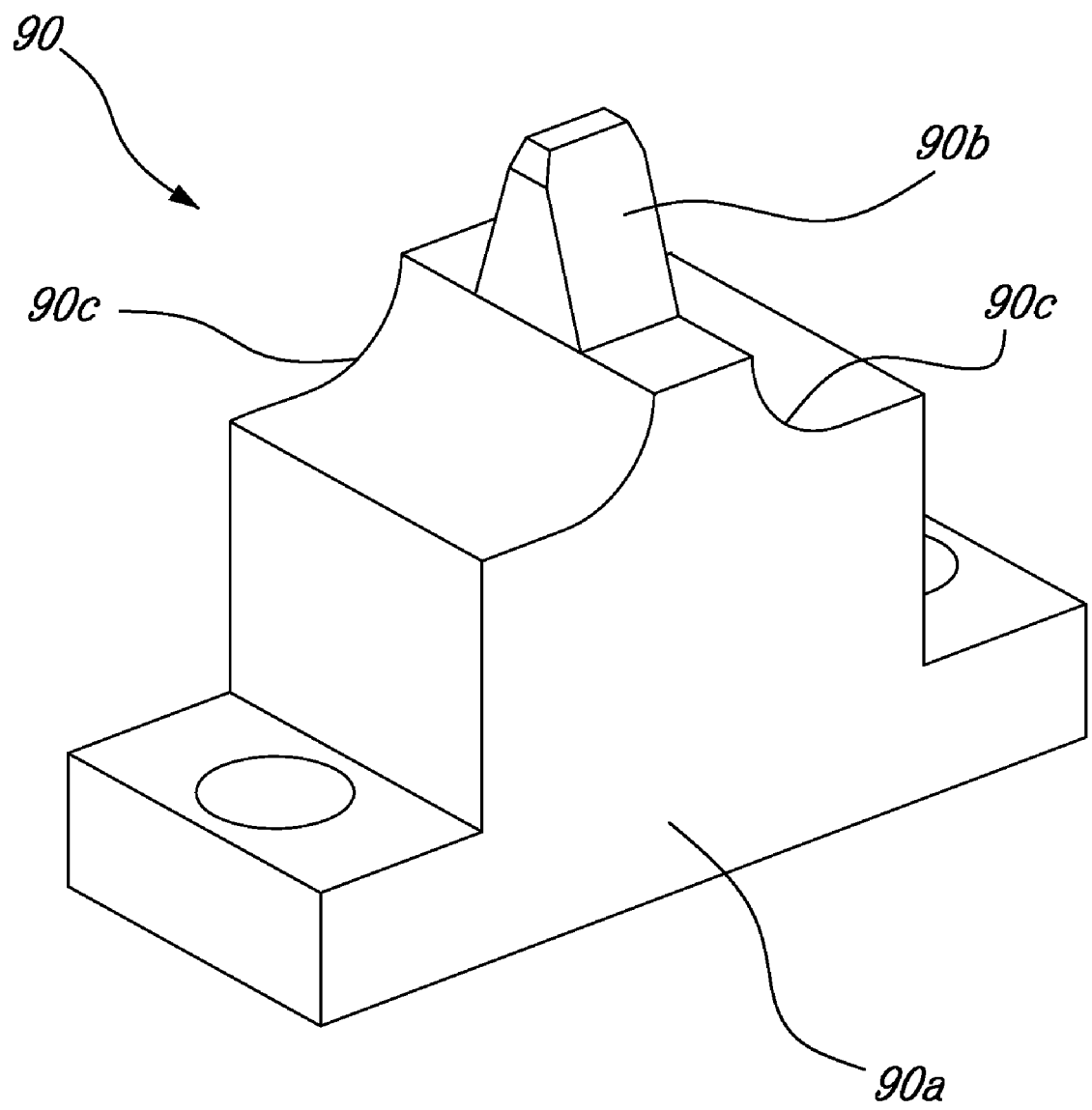
FIG. 13 is an isometric view of the punch head used in the press shown in FIG. 7.

FIG. 13 in an enlarged side view of a punch head 90 used in the illustrated embodiment. This punch head 90 comprises a base 90a over which projects a wedge-shaped member 90b. The junction between the wedge-shaped member 90b and the base 90a, on opposite transversal sides, have rounded portions 90c designed to progressively guide the corresponding tab 18 of the picket 12 from its initial position to the final bended position as the punch head 90 moves towards the opening of the rail 14, 16 during a stroke of the press 50. At the end of the stroke, the wedge-shaped member 90b penetrates inside the interior of the picket 12. The H-shaped opening 20 is designed to give room for it. Also, the wedge-shaped member 90b holds the bottom rail 14 in the press 50 while the pickets 12 are inserted therein.

The press 50 is designed so that the movement of the upper beam 80 is stopped when all tabs 18 are at their final position. It may nevertheless continue pressing slightly since the springs 94 can compensate for some of the force applied by the press at the end of the stroke.

Figure 14:
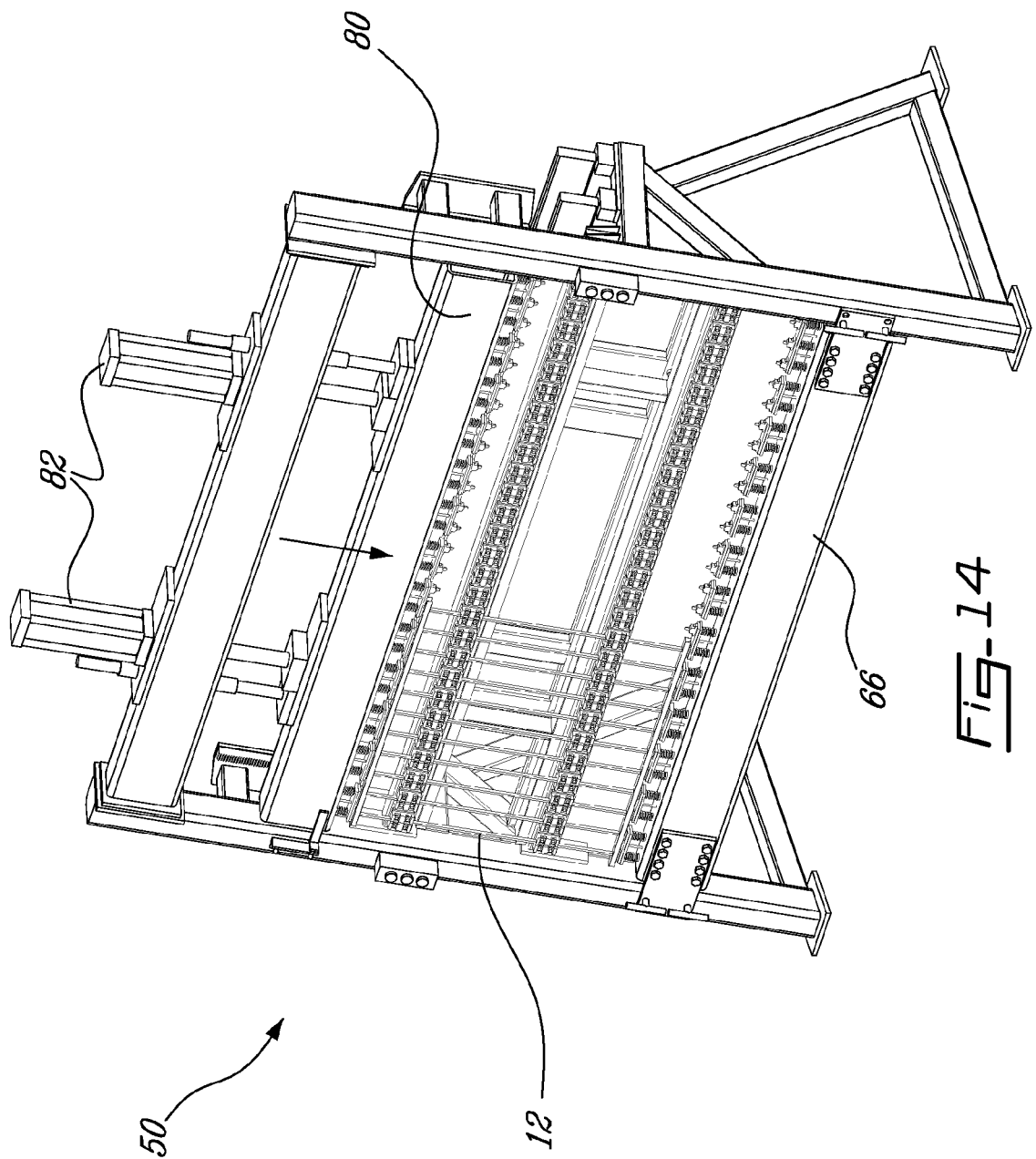
FIG. 14 is a view similar to FIG. 7, showing the press at the end of its downwards stroke.

FIG. 14 shows the press 50 near the end of the stroke.

The exact location where the upper beam 80 stops may be determined by an operator, with or without the use of sensors.

As can be appreciated, sections 10 of railing systems can be easily and quickly produced without the need of screws or the like. The operator simply has to position the parts and operate the press 50. It is even possible to partially or fully automate the press 50 with corresponding robotic systems capable of positioning the various parts and removing the section 10 when the upper beam 80 is moved back to its initial position in preparation for the next cycle.

It should be noted that the arrangement for moving the upper beam can be different than that is shown in the enclosed figures. For instance, it is possible to use one or more than two hydraulic actuators. Other kinds of actuators are possible, for instance actuators involving an endless screw driven by an electric motor. A system with cables pulled by an electric motor is also possible. Moreover, it is possible to invert the configuration and move the bottom beam with reference to a fixed upper beam. Moving simultaneously the bottom and upper beams with reference to each other is further possible.

Aluminium is the material of choice for the railing system. Nevertheless, it is possible to use some parts made of a material that does not contain aluminium or parts that are not entirely made of a material containing aluminium. For instance, the central portion of the pickets can be made of one material and its ends of another material, in particular a ductile material. The rails and the pickets are not necessarily made of the same material or even made of a metal.

It is possible to use the press to connect only one rail to the pickets, or to connect one of the bottom or upper rail in one stroke of the press, and then connect the other rail in a second stroke of the press. Punch heads may be provided on only one of the bottom or upper beam, or mounted without the use of springs at the bottom beam, the upper beam or both. Also, the punch heads can be individually connected to the bottom and/or upper beam, and also be laterally adjustable in position. Punch heads can be irregularly spaced, either when using adjustable punch heads or permanently positioned punch heads. If desired, more than one distinct section can be assembled at the same time during a stroke of the press. The punch heads between the two rows of the press, if two or more rows are used, can be offset.

It should be noted that the pickets can have another outer cross section, including a rounded or a triangle cross section, or a cross section with more than four sides. The interior of the pickets can be solid instead of being hollow, as illustrated. Pickets of various shapes can be used in the same section. Some sections can have areas without pickets connected as described herein, either for insertion of an ornamentation or to mount pickets using another technique. Pickets of a same section can be irregularly shaped. Similarly, the tabs and the corresponding openings can have a different shape than what is shown, depending on the needs. The exact shape and configuration of the rails can also be different than that illustrated in the figures and accordingly, the rails are not necessarily U-shaped. The rails and the pickets are not necessarily perpendicular. For example, the ramp of a stairway would have vertical pickets connected to inclined rails. The press can be modified to accommodate these inclined sections, for example by using an arrangement to tilt the bottom and the upper beam within the front plane of the press.

It should be noted that removable brackets or other connection systems (not shown) can also be used instead of the integral brackets of the illustrated example.

The shape of the tabs and the shapes of the corresponding openings in the rails can be different than that shown in the enclosed figures, the H-shaped opening being only one possible type of opening. For instance, a square- or rectangular-like opening is possible. Similarly, using two unconnected adjacent slits would have been possible instead of the H-shaped opening. Together, these two adjacent slits form an equivalent of an opening. The tabs and the openings can be different between the ones at the bottom rail and those at the upper rail. If desired, only some of the connections between the pickets and the rails of a same section can use tabs and openings as described. Still, various combinations of two or more different sets of tabs and/or openings can be used at the top and/or at the bottom. Although tabs are said to be bended once connected to the rail or rails, the word "bended" or the similar words do not necessarily means that that they must be bended at an angle of 90 degrees near their root. These words also mean that the tabs can be otherwise deformed. If desired, the main frame of the press can be upright instead of being inclined. The apparatuses shown in FIGS. 3 and 4 are only examples. Other apparatuses and methods can be used to form a bracket, including connecting a bracket made from a piece initially unconnected to a rail.

What is claimed is:

1. A press for assembling a section of a railing system, the press comprising:
   a main frame having a front portion;
   a bottom transversal beam rigidly connected to the front portion of the frame;
   an upper transversal beam extending substantially parallel to the bottom beam,
   a movable supporting assembly provided between the upper beam and the main frame to move the upper beam in a plane defined generally by the front portion of the main frame;
   at least one set of tab-bending punch heads, the set being disposed on the bottom beam or the upper beam; and
   a plurality of picket holders extending in at least one transversal row between the bottom and upper beams.

2. The press as defined in claim 1, wherein at least one of the punch heads is resiliently connected to the corresponding beam.

3. The press as defined in claim 1, wherein at least two of the punch heads are mounted on a common base.

4. The press as defined in claim 1, wherein each punch head includes a wedge-shaped projecting member.

5. The press as defined in claim 1, wherein each picket holder is adjustable in width.

6. The press as defined in claim 1, wherein the movable supporting assembly includes at least one hydraulic actuator, the actuator being provided between an overhead transversal beam rigidly connected to the front portion of the main frame and the upper beam.

7. The press as defined in claim 1, wherein the movable support assembly comprises a sliding guide extending between the overhead beam and the upper beam.

8. The press as defined in claim 1, wherein the front portion of the main frame is inclined with reference to the vertical.

9. A press for at least partially assembling a section of a railing system, the section having two parallel and spaced apart rails between which are provided a plurality of spaced-apart pickets to be connected to at least one of the rails by means of end tabs, the press comprising:
   a main frame having a front portion;
   a bottom transversal beam connected to the front portion of the main frame;
   an upper transversal beam connected to the front portion of the main frame;
   a movable supporting assembly configured and disposed to move at least one among the bottom transversal beam and the upper transversal beam in a plane defined by the front portion of the main frame, the bottom transversal beam and the upper transversal beam;
   a first transversal row of spaced-apart punch heads provided over the bottom transversal beam;
   a second transversal row of spaced-apart punch heads provided under the upper transversal beam and facing the punch heads of the first row;
   at least one transversal row of picket holders adjacent to the front portion of the main frame between the bottom transversal beam and the upper transversal beam, each picket holder of each row being in registry with one punch head in the first row and one punch head in the second row;
   whereby, in use, the end tabs of the pickets are bended by the punch heads upon moving the bottom transversal beam and the upper transversal beam closer to each other.

10. The press as defined in claim 9, wherein at least one of the punch heads is resiliently connected to the corresponding beam.

11. The press as defined in claim 9, wherein at least two of the punch heads are mounted on a common base.

12. The press as defined in claim 9, wherein each punch head includes a wedge-shaped projecting member.

13. The press as defined in claim 9, wherein each picket holder is adjustable in width.

14. The press as defined in claim 9, wherein the movable supporting assembly includes at least one hydraulic actuator, the actuator being provided between an overhead transversal beam, rigidly connected to the front portion of the main frame, and the upper beam.

15. The press as defined in claim 9, wherein the movable supporting assembly comprises a sliding guide extending between the overhead beam and the upper beam.

16. The press as defined in claim 9, wherein the front portion of the main frame is inclined with reference to the vertical.

* * * * *